United States Patent [19]
Ripley et al.

[11] Patent Number: 5,350,140
[45] Date of Patent: Sep. 27, 1994

[54] UNIVERSAL CONTROL CONSOLE

[75] Inventors: Brian D. Ripley; James L. Boston, both of Webster City; Edward G. Luehrmann, Eagle Grove; Dale L. Barglof, Williamsburg, all of Iowa

[73] Assignee: White Consolidated Industries, Inc., Cleveland, Ohio

[21] Appl. No.: 188,361

[22] Filed: Jan. 27, 1994

Related U.S. Application Data

[63] Continuation of Ser. No. 984,360, Dec. 2, 1992, abandoned.

[51] Int. Cl.⁵ .............................................. G12B 9/00
[52] U.S. Cl. .................................. 248/27.1; 200/296; 312/228; 312/257.1; 312/263
[58] Field of Search ............ 248/27.1; 312/228, 257.1, 312/273.1, 263, 265.5; 403/315, 319, 289, 335, 245, 246; 361/807; 200/296, 295

[56] References Cited

U.S. PATENT DOCUMENTS

| | | | |
|---|---|---|---|
| 3,253,874 | 5/1966 | Czech | 312/228 |
| 3,868,077 | 2/1975 | Van Tiel | 248/27.1 |
| 3,995,922 | 12/1976 | Ohashi | 312/263 |
| 4,253,486 | 3/1981 | Hardin | 200/296 X |
| 4,277,122 | 7/1981 | Bargile | 312/263 |
| 4,732,431 | 3/1988 | Mason | 312/257.1 |
| 5,013,105 | 5/1991 | Rossum | 312/257.1 |
| 5,167,465 | 12/1992 | Inui | 200/296 X |
| 5,256,841 | 10/1993 | Zanella . | |

FOREIGN PATENT DOCUMENTS

| | | | |
|---|---|---|---|
| 2249483 | 10/1972 | Fed. Rep. of Germany | 312/228 |
| 1193016 | 10/1959 | France | 200/296 |

OTHER PUBLICATIONS

U.S. Patent application Ser. No. 07/890,672, filed May 29, 1992, Entitled "Console with Snap Fit End Caps".

*Primary Examiner*—J. Franklin Foss
*Attorney, Agent, or Firm*—Pearne, Gordon, McCoy & Granger

[57] ABSTRACT

The present invention pertains to a universal control console for use on domestic washing machines or dryers. The control console of the present invention extends between a pair of mounting end caps, and provides a plurality of mounting means to facilitate the mounting and attachment of controls thereto. The apertures include a central aperture having upwardly and downwardly extending rectangular apertures and a generally circular main opening. The main opening includes a pair of opposed radial notches. Below the downwardly extending rectangular aperture is a generally T-shaped aperture. Several generally tab-receiving apertures are laterally-spaced from the central aperture. The openings in the control console cooperate to mount a variety of control devices, allowing interchangeability among controls which is desirable for different appliance models. The control console of the present invention can be used with numerous models of washing and drying machines, eliminating the need to have custom-designed control consoles for each machine model.

10 Claims, 2 Drawing Sheets

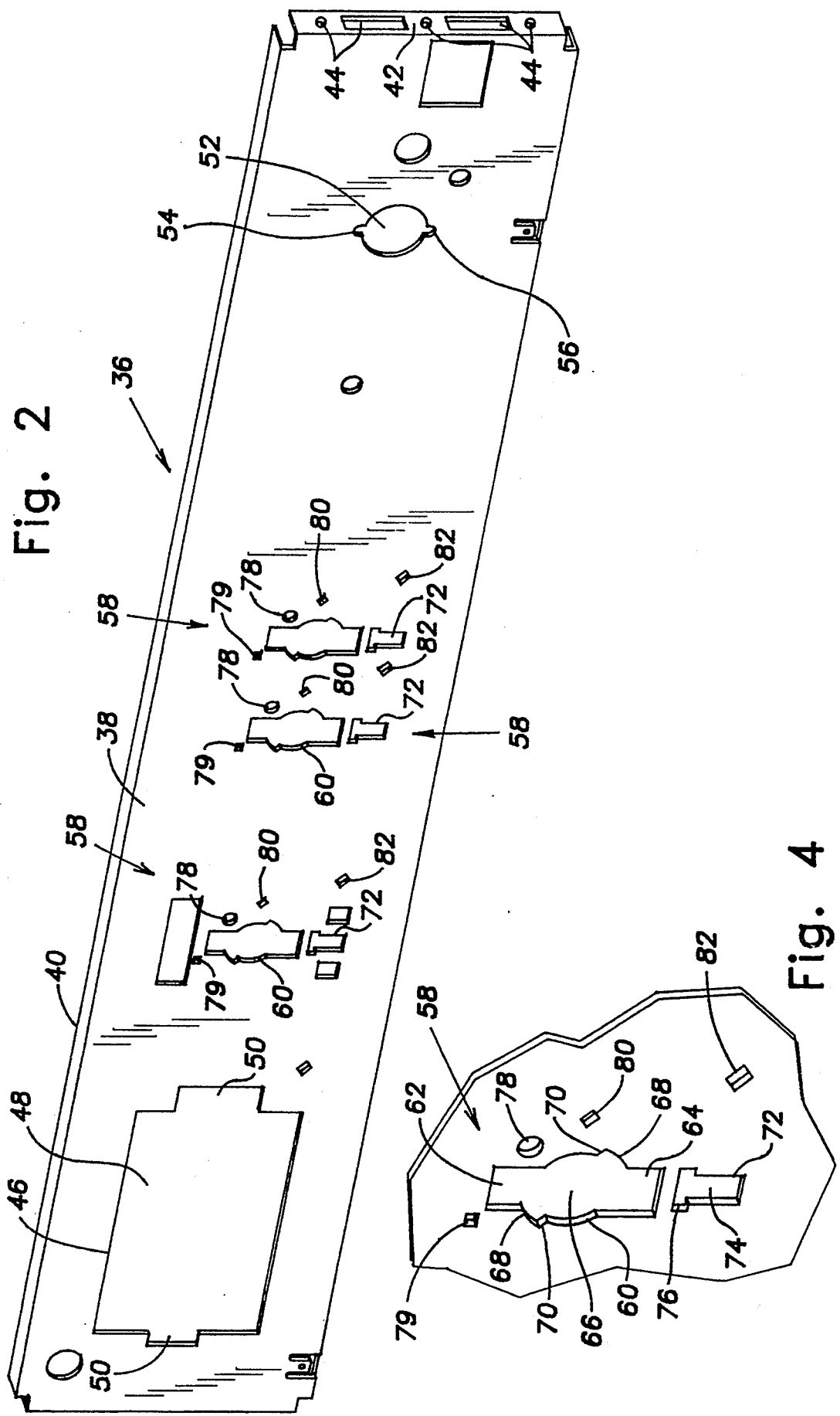

UNIVERSAL CONTROL CONSOLE

This is a continuation of application Ser. No. 07/984,360, filed Dec. 2, 1992 now abandoned.

BACKGROUND OF THE INVENTION

1. Field of the Invention

The present invention pertains generally to domestic appliances and, more particularly, to control consoles used on domestic washing and drying machines.

2. Description of the Related Art

Control consoles known in the art generally provide a series of punched-out apertures to facilitate mounting of control devices thereto. Typically, the punch outs are specially designed to receive a specific control device. Therefore, for any particular control console, each control device can be mounted only at the location which corresponds to its specially designed aperture.

Hence, in the prior art, if it is desired to re-arrange the control devices, as normally is the case among the various models of an appliance, it is necessary to produce a new control console with a correspondingly different arrangement of punch-outs formed therein. Therefore, it is common for each of the various models of appliances to have its own custom control console. Since each appliance model in the prior art must have its own control console, there is a high cost associated with this aspect of producing the various models.

Moreover, the control mounting apertures provided in the common control consoles tend to require a large number of independent fasteners to mount the control devices thereto. This leads to longer assembly time, increased manufacturing costs and, ultimately, increased final product cost.

Therefore, there exists a need in the art for a control console which includes control mounting apertures which are adapted to interchangeably receive various control devices and thereby enable a single control console to serve in several appliance models. Also, there exists a need in the art for a control console which allows mounting of the control devices thereto with a minimum of additional fasteners being required, reducing assembly time and cost.

SUMMARY OF THE INVENTION

The present invention is directed towards a universal control console having control mounting means formed therein which is adapted to interchangeably receive the various control devices used on different models of washing and drying machines. The interchangeability of the control devices allows a single control console to be used in several appliance models.

The present invention is also directed towards a universal control console which enables the control devices used on the various models of washing and drying machines to be mounted thereto with a minimum of independent fasteners being required.

The control mounting means of the present invention comprises a pattern of holes or apertures. This hole pattern includes a generally central aperture, a generally a T-shaped aperture, and a plurality of laterally spaced mounting apertures. The various apertures which comprise the hole pattern are advantageously arranged and cooperate to allow mounting of a variety of control devices to the universal control console.

In accordance with the present invention, the central aperture provides a generally circular main opening and a pair of outwardly extending apertures. The main opening includes a pair of opposed radial notches. One end of each of the radial notches intersects with one of the outwardly extending apertures while an opposite end of each radial notch defines a stop surface.

In further accordance with the present invention, the T-shaped aperture is downwardly spaced from the central aperture and the plurality of laterally spaced mounting apertures include a screw-receiving hole, a rectangular aperture and proximal and distal openings.

The present invention presents an economical and efficient improvement over the state of the art control consoles, which generally require a different console to be formed for each appliance model. By providing a hole pattern which interchangeably receives any of the control devices, the present invention allows a single control to serve in several appliance models, eliminating the costs associated with providing customized consoles. Furthermore, by adapting the hole pattern to receive the control devices with a minimum of independent fasteners being required, assembly time and costs are further reduced.

BRIEF DESCRIPTION OF THE DRAWINGS

These and further features of the invention will be apparent with reference to the following description and drawings, wherein:

FIG. 2 is a perspective view of the present invention;

DETAILED DESCRIPTION OF THE PREFERRED EMBODIMENT

Figure 1:
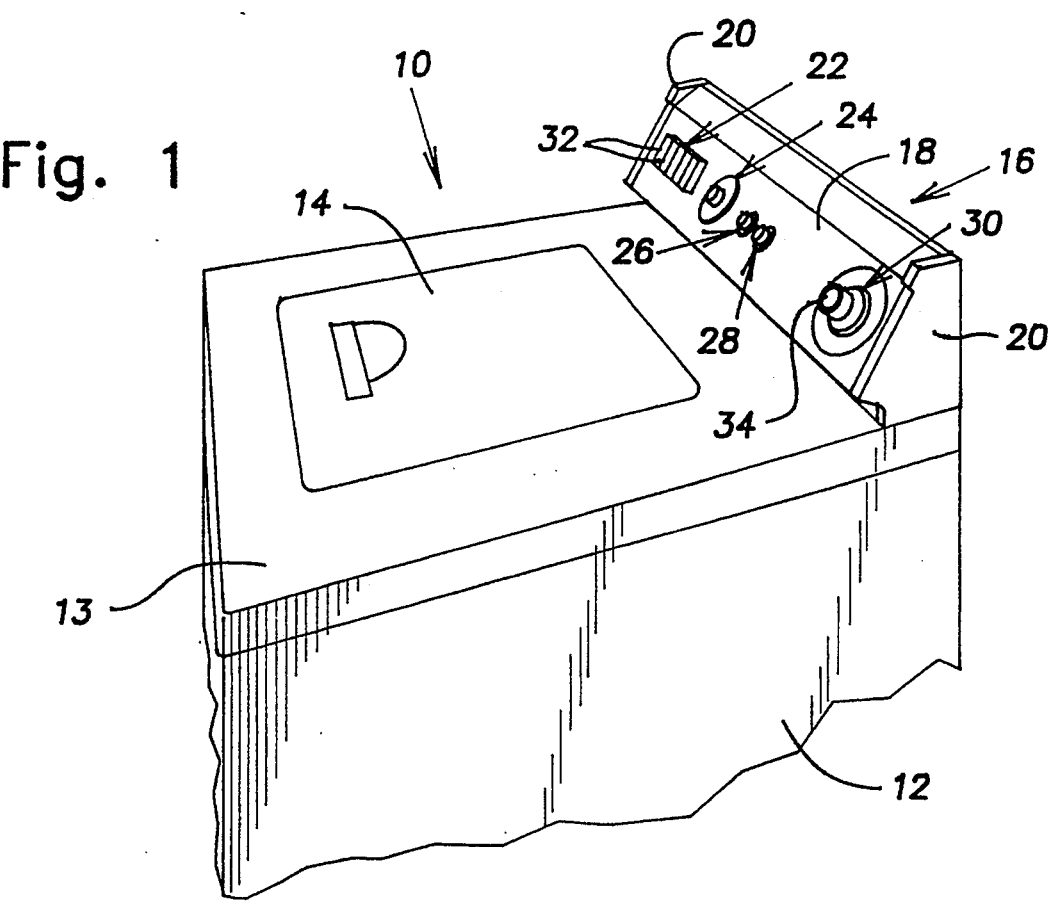
FIG. 1 is a partial perspective view of a domestic washing machine incorporating the universal control console of the present invention.

With reference to FIG. 1, a domestic washing machine 10 incorporating the present invention is shown. As is generally conventional in the art, the washing machine 10 includes an outer cabinet 12 surrounding an upwardly opening clothes-receiving tub (not shown). The upper surface of the cabinet 12 is provided with an upper door 14 and a rearwardly mounted control panel 16. The control panel 16 includes a control console cover plate 18 which is mounted to the upper surface 13 of the cabinet 12 between a pair of end caps 20. Extending out of the control console cover plate 18 are control devices 22, 24, 26, 28, and 30. The first control device identified with reference numeral 22 includes a plurality of push buttons 32 while the fifth control device identified by reference numeral 30 comprises a rotary knob 34.

The second, third and fourth control devices identified with reference numerals 24, 26, and 28, respectively, are optional and can be replaced by other control devices and/or arranged in different orders, as will be described hereafter. These control devices 24, 26, and 28 are used to control the various optional functions of the washing machine, and include push buttons and rotary switches, as well as timers or any other known control mechanism.

Turning to FIG. 2, a universal control console 36, which is normally located immediately beneath the control console cover plate 18, is shown. The control console 36 includes a planar central section 38 and a peripheral flange 40. The peripheral flange includes a pair of end sections 42 (only one shown), which facilitate mounting of the end caps 20 to the control console 36. As is described more fully in the commonly assigned U.S. patent application Ser. No. 07/890,672, filed on May 29, 1992, the disclosure of which is expressly incorporated herein by reference, the end sections 42 provide a plurality of apertures 44 which receive and retain the end caps 20.

Figure 3:
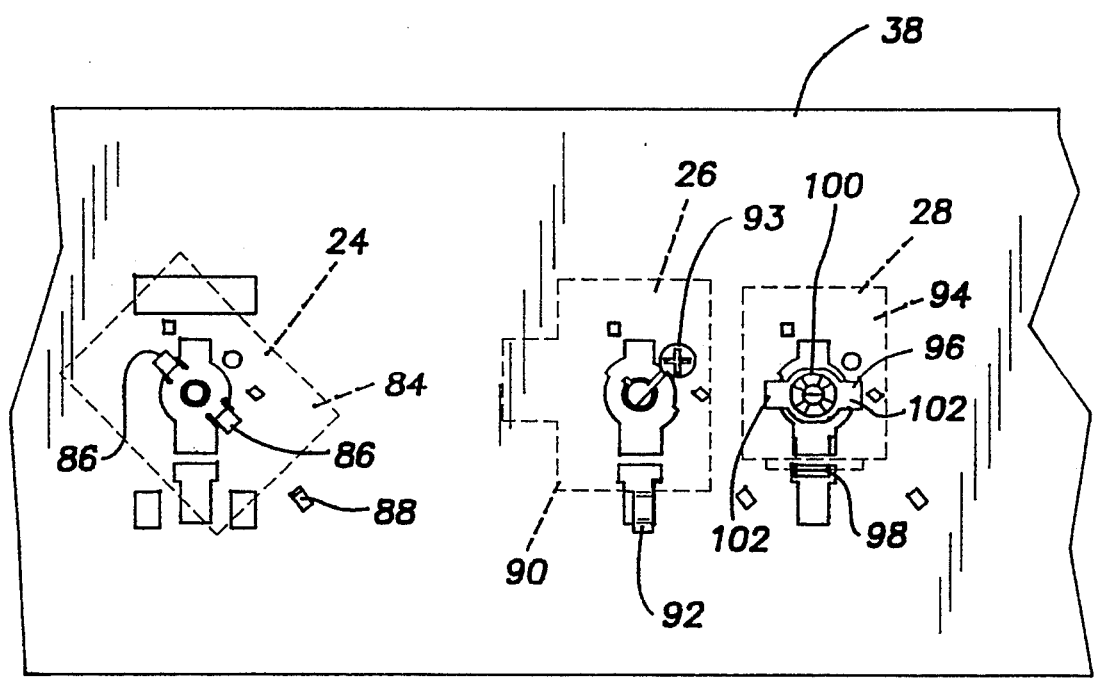
FIG. 3 is a front elevational view of the control mounting means of the control console, with representative control devices mounted thereto; and, FIG. 4 is a perspective view of the hole pattern comprising the control mounting means of the present invention.

The planar central section 38 includes a plurality of punch-outs which are adapted to receive the various control devices 22, 24, 26, 28, 30, one possible combination of control devices being illustrated in FIGS. 1 and 3.

As shown in FIG. 2, the left side of the central section 38 provides a large, generally rectangular punch-out 46 having a central section 48 and a pair of lateral ears 50. The punch out 46 is provided for receipt of the first control device 22, a multi-button switch, as illustrated in FIG. 1. Similarly, on the right side of the central section 38, a generally circular punch-out 52 including upper and lower notched portions 54, 56 is provided for receipt of the fifth control device 30, a rotary dial, as illustrated in FIG 1. These punch-outs 46, 52, together with the first and fifth control devices 22, 30 which are mounted therein, do not form part of the present invention and will not be further discussed herein.

As shown best in FIGS. 2 and 4, the planar central section 38 of the universal control console 36 also includes a plurality of universal control mounting means 58 for receipt of any of the second, third or fourth control devices 24, 26 or 28. Each of the universal control mounting means 58 includes a pattern of mounting punch-outs or apertures, as illustrated. The pattern of apertures forming the mounting means 58 includes a central aperture 60 which comprises a mounting body receiving means.

The central aperture 60 has a pair of outwardly extending mounting apertures 62, 64 and a generally circular main opening 66. Preferably, as shown best in FIGS. 3 and 4, the upper mounting aperture 62 is smaller in a width dimension than the lower mounting aperture 64. The main opening 66 includes a pair of opposing radially notched portions 68. Each of the radially notched portions 68 intersects one of the pair of outwardly extending mounting apertures 62, 64. The other end of each of the radially notched portions 68 defines a stop surface 70, as illustrated.

Below the central aperture 60 the universal mounting means 58 provides a generally T-shaped aperture 72. As illustrated, the vertical leg 74 of the T-shaped aperture 72 is larger in a width dimension than the vertical width of a horizontal arm 76 thereof. The T-shaped aperture is adapted to slidably receive a mounting projection such as a tang or the like, as will be described hereafter.

On one side of the central aperture 60 is provided a circular screw-receiving hole 78 and proximal and distal openings 80, 82. On another, opposite side of the central aperture 60 is provided a rectangular aperture 79. Preferably, the openings 80, 82 are shaped as squares that have been rotated about 45°, as illustrated. The rectangular aperture 79 and the proximal and distal openings 80, 82 comprise a tab receiving means and are each adapted to receive and retain an elastic tab, as will be described hereafter.

Mounting of the control devices 24, 26, and 28 in the hole pattern which comprises the mounting means 58 provided by the planar central section 38 of the universal control console 36 will be described hereafter with reference to the foregoing description and drawings.

As shown in FIG. 3, various control devices having different mounting methods can be inserted within the pattern of holes which form the mounting means 58 of the present invention. As shown at the left side of FIG. 3, the first control device 24 is mounted within the pattern of holes which comprise the mounting means 58 of the present invention. The first control device 24 provides a mounting bracket 84 which includes a pair of tabs 86 which extend through and mount within the central aperture 60 and a third tab or projection 88 which elastically extends through the distal opening 82.

Mounting is accomplished by first inserting each of the tabs 86 through one of the pair of outwardly extending mounting apertures 62, 64. Thereafter, the first control device 24 is rotated, causing the tabs 86 to engage the stop surfaces 70 provided at an end of each of the radial notches 68, as discussed previously. Simultaneously, the third tab or projection 88 provided by the control device mounting bracket 84 elastically extends into the distal opening 82 provided by the mounting means 58, preventing the first control device 24 from being rotated in the opposite direction, and thereby precluding removal of the first device from the universal control console 36. Naturally, it should be clear that the third tab 88 could be designed, or further tabs added, to elastically extend into the proximal opening 80 and/or the rectangular aperture 79.

In the center of FIG. 3 is shown the second control device 26 mounted to the universal control console 36 via a mounting bracket 90 and the mounting means 58 of the present invention. The mounting bracket 90 provides a downwardly directed tang 92, and a screw-receiving aperture (not shown). The screw receiving aperture aligns with the circular hole 78 provided by the mounting means 58.

The second control device 26 is mounted by slipping the tang 92 into the T-shaped aperture, and pushing the second control device 26 downwardly until the screw-receiving aperture aligns with the circular hole 78. Thereafter, a screw 93 is inserted into the screw-receiving aperture in the mounting bracket 90 via the circular hole 78 to removably retain the second control device 26 in place on the console 38.

The third control device 28 is depicted on the right side of FIG. 3 includes a mounting bracket 94 and a mounting body 96. The mounting bracket 94 includes a tab 98. The mounting body has a central body 100 and a pair of outwardly directed wings 102. Mounting is accomplished by inserting the mounting body 96 through the pair of outwardly extending mounting apertures 62, 64 provided by central aperture 60 and turning the third control device 28 to engage the outwardly directed wings 102 with the outer side of the universal control console 36. When the outwardly directed wings 102 of the mounting body 96 reach a generally horizontal position, as shown in FIG. 3, the tab 98 provided by the mounting bracket 94 elastically snaps into the arm 76 of the T-shaped aperture 72, positively mounting the control device 28 therein.

Once the various control devices 24, 26, and 28 are mounted to the control console 36, the control console cover plate 18 can be placed over the control console 36 and the various user engageable actuating devices attached to the control devices 24, 26 and 28. Depending upon the control device involved, the actuating devices may be push buttons, slide switches, rotary dials or any known type of switch actuator.

When, during maintenance or repair, it is desired to remove one of the control devices 24, 26 and 28 which are at least partially retained within the mounting means via an elastic tab, it is merely necessary for the technician to first outwardly deform the tab, thus removing it from the receipt of the respective laterally spaced aperture and thereafter reversing the prior installation procedure. For example, in the case of the first control device 24, removal is accomplished by outwardly deforming the tab 88, rotating the device 24 to align the tabs 86 with the pair of outwardly extending mounting apertures 62, 64, and thereafter pulling the device 24 through the central aperture 60. Hence, removal of the control devices mounted in the universal control console is an easy matter, a minimum of independent fasteners, in most cases none, being required to be preliminarily removed prior to removal of the device from the mounting means 58.

It should be clear that the control devices depicted herein are fully interchangeable, a variety of combinations being possible. As presented, the mounting means 58 provided by the universal control console 36 allows each of the various control devices illustrated to be mounted there with a minimum of independent fasteners being required. Moreover, it is apparent that numerous different combinations of the several holes of the hole pattern are useable to mount a control device to the universal control console. For example, the illustrated control mounting brackets extend through specific ones of the plurality of laterally spaced mounting apertures 78, 79, 80, and 82. Since the present invention is primarily directed towards a mounting means 58 which includes a hole pattern to allow a variety of control devices with different mounting schemes to be interchangeably mounted therein, it is clear that one of the objects of the present invention is to allow and encourage the control device mounting brackets to be modified to include tabs which extend through others of the laterally spaced mounting apertures.

Therefore, the foregoing mounting schemes are to be considered merely illustrative of some of the varying mounting methods that are possible with the present invention. The universal control console illustrated herein is provided as an example of the preferred embodiment presently contemplated by the inventors, and is not to be construed in a limitative manner, the present invention being capable of being presented in several equivalent manners. Therefore, the scope of the present invention is to be defined only by the claims appended hereto.

What is claimed is:

1. A universal control console, comprising a generally planar central section and a pair of end section, said central section defining a hole pattern which is adapted to interchangeably receive control devices, said hole pattern including a central aperture and a plurality of laterally-spaced mounting apertures, said central aperture comprising a main opening and a plurality of outwardly extending apertures, wherein the central aperture and the laterally-spaced openings are adapted to interchangeably receive the control devices, and a generally T-shaped opening, said T-shaped opening being downwardly spaced from said central aperture.

2. A universal control console according to claim 1, wherein the laterally spaced mounting apertures of the hole pattern include rectangular and circular openings.

3. A universal control console according to claim 1, wherein said central aperture includes at least one notch, said notch intersecting one of said outwardly extending apertures and having a terminal end which defines a stop surface.

4. A universal control console according to claim 1, wherein said main opening is generally circular and one of the mounting apertures is above the main opening and another of the mounting apertures is below the main opening.

5. A universal control console for a domestic appliance, said console defining a plurality of hole patterns, each of which is adapted to interchangeably receive control devices therein, said hole pattern comprising:
a central aperture, said central aperture having a main opening and a pair of generally opposed, outwardly-extending apertures, said main opening including a pair of opposed radial notches, a terminal end of each of said pair of radial notches defining a stop surface, said central aperture being adapted to releasably receive a mounting portion of a control device;
a hole, said hole being laterally spaced from said central aperture and being designed to receive a control device mounting fastener;
proximal and distal openings, said proximal and distal openings being laterally spaced from a first side of said central aperture and being adapted to receive control device mounting tabs;
a first aperture, said first aperture being laterally spaced from a second side of said central aperture and being adapted to receive a control device mounting tab, said second side being opposite said first side; and,
a second aperture, said second aperture being downwardly spaced from said central aperture and being adapted to slidably receive a control device mounting tang.

6. A universal control console according to claim 5, wherein said second aperture is generally T-shaped.

7. A universal control console comprising a control device mounting means, said mounting means including means for receiving a mounting body of a control device mounting bracket and means for receiving elastic mounting tabs provide by said mounting bracket, whereby when said control device mounting bracket is mounted to said universal control console the mounting body is received by the mounting body receiving means and an elastic tab is received by the elastic mounting tab receiving means.

8. A universal control console according to claim 7, wherein the means for receiving a mounting body of a control device comprises a central aperture, said central aperture including a main opening, a plurality of outwardly extending apertures, and at least one notch, said notch intersecting one of said outwardly extending apertures and having a terminal end which defines a stop surface.

9. A universal control console according to claim 7, wherein said means for receiving elastic mounting tabs comprises a plurality of mounting apertures.

10. A universal control console according to claim 8, wherein said means for receiving elastic mounting tabs comprises a plurality of mounting apertures, said mounting apertures being laterally spaced from said central aperture.

* * * * *

UNITED STATES PATENT AND TRADEMARK OFFICE
CERTIFICATE OF CORRECTION

PATENT NO. : 5,350,140

DATED : September 27, 1994

INVENTOR(S) : Ripley et al.

It is certified that error appears in the above-identified patent and that said Letters Patent is hereby corrected as shown below:

Column 1, line 62, delete "a" (first occurrence).

Column 2, line 17, after "control" insert --console--.

Column 5, line 26, delete "there" and insert --therein--; and
line 58, (Claim 1, line 2), delete "section" (second occurrence) and insert --sections--.

Column 6, line 46, (Claim 7, line 5), delete "provide" and insert --provided--; and
line 48, (Claim 7, line 7), after "console" insert --,-- (comma).

Signed and Sealed this

Tenth Day of January, 1995

*Attest:*

BRUCE LEHMAN

*Attesting Officer*    *Commissioner of Patents and Trademarks*